US008842686B2

(12) United States Patent
Suzuki

(10) Patent No.: US 8,842,686 B2
(45) Date of Patent: Sep. 23, 2014

(54) COMMUNICATION SYSTEM CONFIGURED WITH AN SIP FUNCTIONED RELAY SERVER AND COMMUNICATION METHOD USING THE SAME

(75) Inventor: Yoshihiro Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 128 days.

(21) Appl. No.: 13/571,508

(22) Filed: Aug. 10, 2012

(65) Prior Publication Data
US 2013/0039258 A1 Feb. 14, 2013

(30) Foreign Application Priority Data

Aug. 11, 2011 (JP) .................................. 2011-175641

(51) Int. Cl.
*H04L 12/28* (2006.01)
*H04L 29/06* (2006.01)
*H04L 29/12* (2006.01)

(52) U.S. Cl.
CPC ............ *H04L 61/6086* (2013.01); *H04L 69/14* (2013.01); *H04L 65/1006* (2013.01); *H04L 65/102* (2013.01); *H04L 61/1529* (2013.01); *H04L 61/1511* (2013.01)
USPC ........................................................ 370/401

(58) Field of Classification Search
CPC ................................................. H04L 12/2859
USPC .......... 370/401, 422, 431, 437; 709/223, 227, 709/230, 231, 238
See application file for complete search history.

(56) References Cited

U.S. PATENT DOCUMENTS

| 7,443,842 B2 * | 10/2008 | Miyamoto et al. ............ 370/356 |
| 7,856,506 B2 * | 12/2010 | Takeda .......................... 709/227 |
| 8,224,985 B2 * | 7/2012 | Takeda .......................... 709/237 |
| 2006/0168229 A1 * | 7/2006 | Shim et al. .................... 709/226 |
| 2011/0320585 A1 | 12/2011 | Pope et al. |
| 2012/0233333 A1 * | 9/2012 | Ganesan et al. .............. 709/227 |

FOREIGN PATENT DOCUMENTS

| JP | 2009-208430 | 9/2009 |
| WO | 2005/020534 | 3/2005 |

OTHER PUBLICATIONS

Chatterjee et al., Instant Messaging and Presence Technologies for College Campuses, IEEE Network, vol. 19, pp. 4-13, May 2005.
Greene et al., Instant Messaging & Presence Management in Mobile Ad-Hoc Networks, Proceedings of the Second IEEE Annual Conference on Pervasive Computing and Communications Workshops, pp. 55-59, Mar. 2004.
Guha et al., NUTSS: A SIP-based Approach to UDP and TCP Network Connectivity, SIGCOMM '04 Workshops, pp. 43-48, Aug. 30, 2004.
Extended European Search Report dated Dec. 5, 2012 for corresponding Application No. 12180053.6.

\* cited by examiner

*Primary Examiner* — Dmitry H Levitan
(74) *Attorney, Agent, or Firm* — Morgan, Lewis & Bockius LLP

(57) ABSTRACT

A communication system (1) has a relay server (S) assigned to a wide area IP network (net1) and having a SIP function, a transmitting terminal (C1) transmitting over the relay server (S), and a receiving terminal (C2) receiving over the relay server (S); the transmitting terminal (C1) and the receiving terminal (C2) have a first IP address (21A) for communicating over the wide area IP network (net1) and a second IP address (21B) for communicating over a short circuit (XD) in an Internet network using XMPP as a communication protocol; and the transmitting terminal (C1) switches to the short circuit (XD) and communicates after communication with the receiving terminal (C2) is established over the wide area IP network (net1).

6 Claims, 10 Drawing Sheets

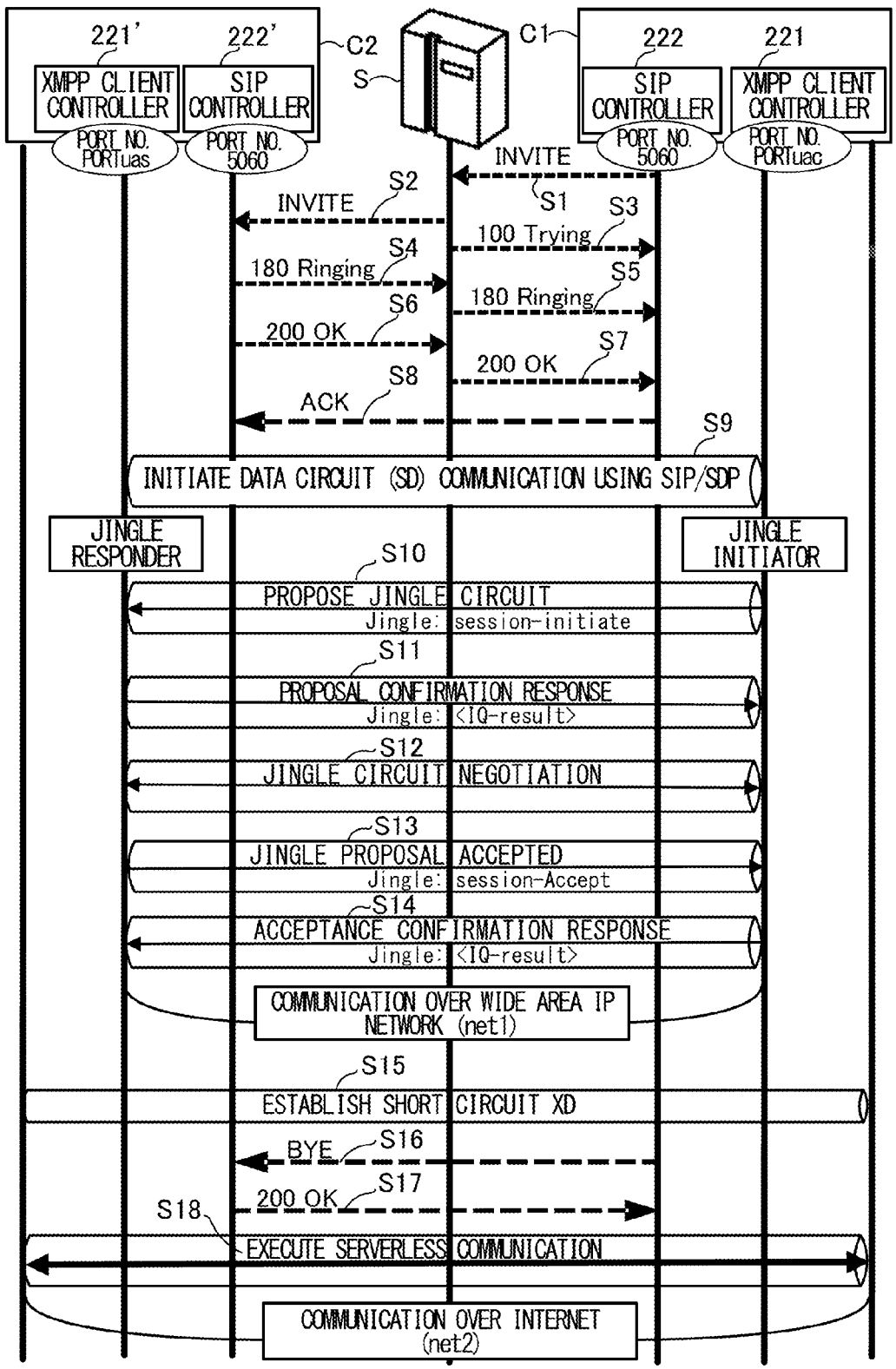

FIG.4 d1

C1(IPuac:PORTuac) -> multicast: c1.local. A IPuac
C1(IPuac:PORTuac) -> multicast: c1@c1_presence._tcp.local. SRV 5562 C1.local.
C1(IPuac:PORTuac) -> multicast:_presence._tcp.local.PTR C1@C1_presence._tcp.local.
C1(IPuac:PORTuac) -> multicast: C1@C1_Presence._tcp.local. IN TXT
"txtvers=1"
"email=C1@C1"
"hash=sha-1"
"jid =C1@C1"

FIG.5 d2

C2(IPuas:PORTuas) -> multicast: c2.local. A IPuas
C2(IPuas:PORTuas) -> multicast: C2@C2_presence._tcp.local. SRV 5562 C2.local.
C2(IPuas:PORTuas) >>multicast:_presence._tcp.local.PTR C2@C2_presence._tcp.local.
C2(IPuas:PORTuas) -> multicast: C1@C1_Presence._tcp.local. IN TXT
"txtvers=1"
"email=C2@C2"
"hash=sha-1"
"jid =C2@C2"

FIG.6

```
C1(IPuas:PORTuas): <stream:stream
                    xmlns='jabber:client'
                    from=C1@C1
                    to=C2@C2
                    version='1.0'>

C2(IPuas:PORTuas): <stream:stream
                    xmlns='jabber:client'
                    from=C2@C2
                    to=C1@C1
                    version='1.0'>

C2(IPuas:PORTuas): <stream:feature>
                    <starttls xmlns=' urn:ietf:params:xml:ns:xmpp-tls'>
                     <optional/>
                    </starttls>
                   </stream:feature>
``` e1

```
C1(IPuas:PORTuas):
    <iq  from="C1@C1" id="12345" to="C2@C2"
        type="set">
    <jingle action="session-initiate" initiator="C1@C1" id="98765">
      <content creator="initiator">
      <description/>
        <transport <candidate ip="IPc1" port="Portc1"/> />
      </content>
        </jingle>
    </iq>
```

```
C2(IPuas:PORTuas):
    <iq  from="C2@C2" id="12345" to="C1@C1"
        type="result"/>
```

FIG.9

C2(IPuas :PORTuas):

```
<iq from="C2@C2" id="12346" to="C1@C1"
    type="set">
  <jingle action="session-accept" responder="C2@C2" sid="98765">
    <content creator="initiator">
      <description/>
      <transport <candidate ip="IPc2" port="PortC2"/> />
    </content>
  </jingle>
</iq>
``` m3

FIG.10

C1(IPuas :PORTuas):

```
<iq from="Cm@domain" id="12346" to="SCmuc@domain"
    type="result">
``` m4

FIG.11

C1(IP_C1) --> multicast: c1.local. A IPc1
C1(IP_C1) --> multicast: c1@c1._presence._tcp.local. SRV 5562 C1.local.
C1(IP_C1) --> multicast: _presence._tcp.local. PTR C1@C1._presence._tcp.local.
C1(IP_C1) --> multicast: C1@C1._Presence._tcp.local. IN TXT
"txtvers=1"
"email=C1@C1"
"hash-sha—1"
"jid =C1@C1"

C2(IP_C2) --> multicast: c2.local. A IPC2
C2(IP_C2) --> multicast: C2@C2._presence._tcp.local. SRV 5562 C2.local.
C2(IP_C2) --> multicast: _presence._tcp.local. PTR C2@C2._presence._tcp.local.
C2(IP_C2) --> multicast: C1@C1._Presence._tcp.local. IN TXT
"txtvers=1"
"email=C2@C2"
"hash-sha—1"
"jid =C2@C2"

⎫ d4

COMMUNICATION SYSTEM CONFIGURED WITH AN SIP FUNCTIONED RELAY SERVER AND COMMUNICATION METHOD USING THE SAME

This application is based upon the corresponding Japanese Patent Application No. 2011-175641 filed Aug. 11, 2011, the entire contents of which are incorporated herein by reference.

BACKGROUND OF THE INVENTION

1. Field of the Invention

The present invention relates to a communication system and communication method.

2. Description of Related Art

As described in Japanese Laid-open Patent Application No. 2009-208430, information exchange has conventionally been performed between information terminal devices over differing networks. For example, there exists a communication system in which messages are exchanged over the Internet in real time using XMPP protocol.

In the patent literature, an information terminal apparatus in a network A and an information terminal apparatus in a network B exchange information over an Internet network.

However, according to the above conventional communication system, the information terminal apparatus in network A and the information terminal apparatus in network B belong to networks having different private addresses. For this reason, an XMPP server knowing the address of both information terminal apparatus is needed in order to connect the information terminal apparatus in network A and the information terminal apparatus in network B. Thus, there is the problem that the system configuration becomes complex when constructing a conventional communication system.

SUMMARY OF THE INVENTION

The present invention was contrived in order to solve the problem described above, it being an object thereof to readily construct a system enabling communication between terminals on different networks without the need for an XMPP server.

In order to resolve the problem described above, the communication system according to the present invention is a communication system having a relay server assigned to a wide area IP network and having an SIP function, a transmitting terminal transmitting over the relay server, and a receiving terminal receiving over the relay server; the transmitting terminal and the receiving terminal having a first IP address for communicating over the wide area IP network and a second IP address for communicating over a short circuit in an Internet network using XMPP as a communication protocol; in which the transmitting terminal switches to the short circuit and communicates after communication with the receiving terminal is established over the wide area IP network.

According to this configuration, a relay server having a Session Initiation Protocol (SIP) function is assigned to the wide area IP network. The transmitting terminal communicates with the receiving terminal over the relay server using the first IP address. When communication over the wide area IP network is established, communication over the short circuit in the Internet network is performed using the second IP address. The communication protocol is eXtensible Messaging and Presence Protocol (XMPP).

(*1) After the transmitting terminal switches to the short circuit in the communication system of the present invention having the above configuration, communication over the wide area IP network is terminated. According to this configuration, after the transmitting terminal switches to the short circuit, communication over the wide area IP network is terminated. When this happens, communication between the transmitting terminal and the receiving terminal is performed using the short circuit.

Moreover, in the communication system according to the present invention having the above configuration, the wide area IP network comprises a control circuit and a data circuit, and the transmitting terminal sends SIP control data over the control circuit and XMPP control data over the data circuit.

According to this configuration, the wide area IP network is formed from a control circuit and a data circuit. SIP control data is sent over the control circuit, and XMPP control data is sent over the data circuit. In this way, the transmitting terminal varies the data sent according to the circuit.

Moreover, in the communication system according to the present invention having the above configuration, the XMPP control data comprises a HyperText Markup Language (HTML) file.

Moreover, in the communication system according to the present invention having the above configuration, the transmitting terminal uses an SIP Uniform Resource Identifier (URI) to identify the receiving terminal. According to this configuration, the transmitting terminal identifies the receiving terminal using an SIP URI associated with a telephone number or the like.

In order to resolve the problem described above, the communication method according to the present invention is a communication method having a relay server assigned in a wide area IP network and having a SIP function, a transmitting terminal transmitting over the relay server, and a receiving terminal receiving over the relay server; the transmitting terminal and the receiving terminal having a first IP address for communicating over the wide area IP network and a second IP address for communicating over a short circuit in an Internet network using XMPP as a communication protocol; the method comprising the steps of establishing communication between the transmitting terminal and the receiving terminal over the wide area IP network, and switching to the short circuit and communicating.

According to this configuration, a relay server having a Session Initiation Protocol (SIP) function is assigned to the wide area IP network. The transmitting terminal communicates with the receiving terminal over the relay server using the first IP address. After communication over the wide area IP network is established, communication over the short circuit in the Internet network is performed using the second IP address. The communication protocol is XMPP.

The communication method of the present invention having the above configuration also has the step of terminating communication over the wide area IP network after the transmitting terminal switches to the Internet network. According to this configuration, after the transmitting terminal switches to the short circuit, communication over the wide area IP network is terminated. When this happens, communication between the transmitting terminal and the receiving terminal is performed over the short circuit.

BRIEF DESCRIPTION OF THE DRAWINGS

FIG. 3 is a timing chart showing an operation for connecting from the transmitting terminal according to the first embodiment of the present invention to a receiving terminal;

FIG. 4 is an illustration of DNS setting information according to the first embodiment of the present invention;

FIG. 5 is an illustration of DNS setting information according to the first embodiment of the present invention;

FIG. 6 is an illustration of XMPP control data according to the first embodiment of the present invention;

FIG. 9 is an illustration of XMPP control data according to the first embodiment of the present invention;

FIG. 10 is an illustration of XMPP control data according to the first embodiment of the present invention;

FIG. 11 is an illustration of DNS setting information according to the first embodiment of the present invention;

FIG. 12 is an illustration of DNS setting information according to the first embodiment of the present invention;

DETAILED DESCRIPTION OF PREFERRED EMBODIMENTS

Figure 1:
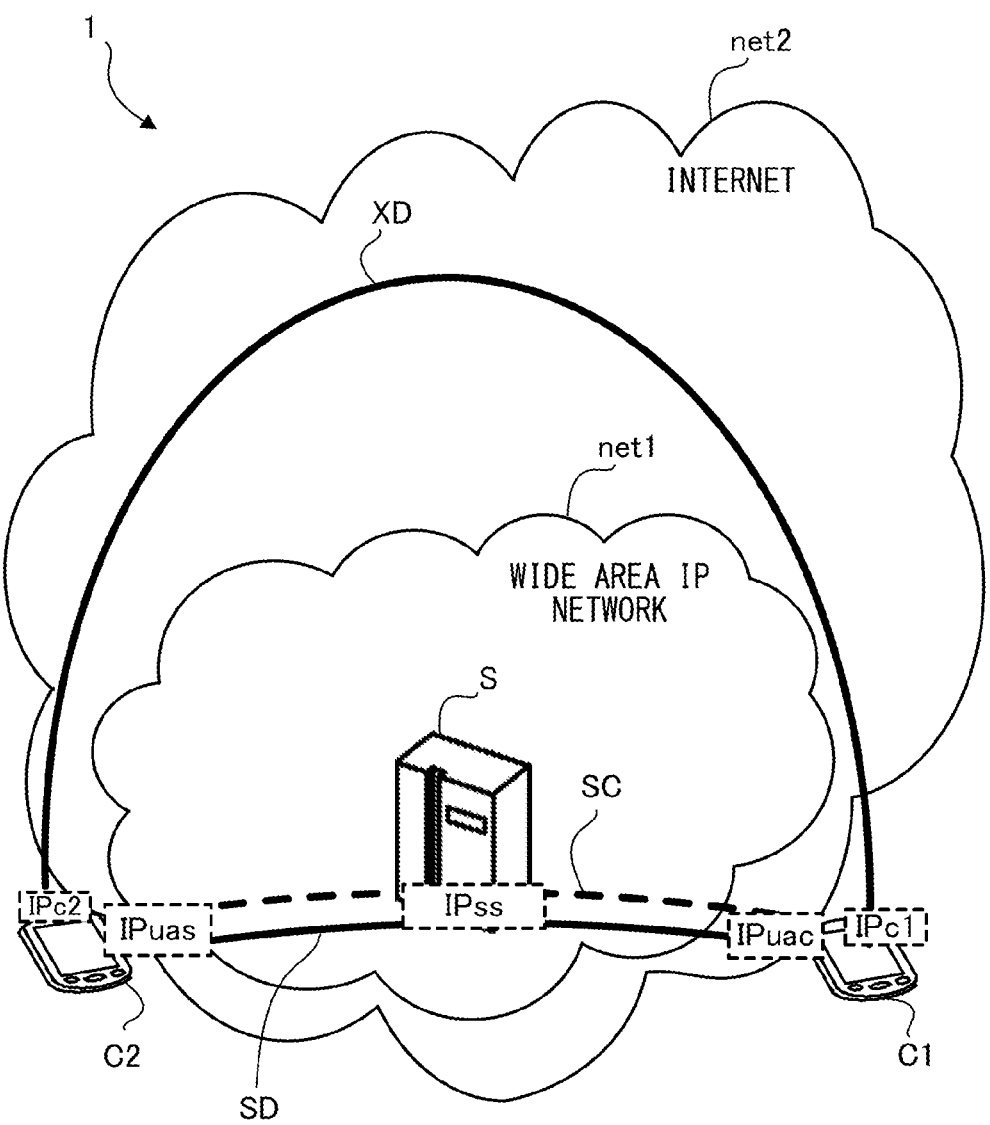
FIG. 1 is an illustration of the overall configuration of a communication system according to a first embodiment of the present invention.

An embodiment of the present invention will be described with reference to the drawings. FIG. 1 is an illustration for describing a communication system 1 according to a first embodiment of the present invention. As shown in FIG. 1, a wide area IP network net1 is provided as a wide area network maintained by a specific communications provider. An Internet network net2 comprehending the wide area IP network net1 is also provided. The wide area IP network net1 is formed from a control circuit SC for sending and receiving SIP control data and a data circuit SD for sending and receiving XMPP control data and the like. A short circuit XD opened through a specific procedure described hereafter is provided in the Internet network net2.

A relay server S, a transmitting terminal C1, and a receiving terminal C2 are assigned to the wide area IP network net1. The relay server S has IPss as an IP address.

The transmitting terminal C1 has IP addresses IPuac, used in the wide area IP network net1, and IPc1, used in the short circuit XD. In communication using IPuac, a port number (5060) for control and a specific port number (PORTuac (cf. FIG. 3)) for data communication are used.

The receiving terminal C2 has IP addresses IPuas, used in the wide area IP network net1, and IPc2, used in the short circuit XD. In [communication using] IPuas, a port number (5060) for control and a specific port number (PORTuas (cf. FIG. 3)) for data communication are used.

The transmitting terminal C1 communicates over the relay server S with a receiving terminal C2 assigned to a different network than the transmitting terminal C1. As described hereafter, when the transmitting terminal C1 opens the short circuit XD, direct communication with the receiving terminal C2 over the short circuit XD is possible.

Figure 2:
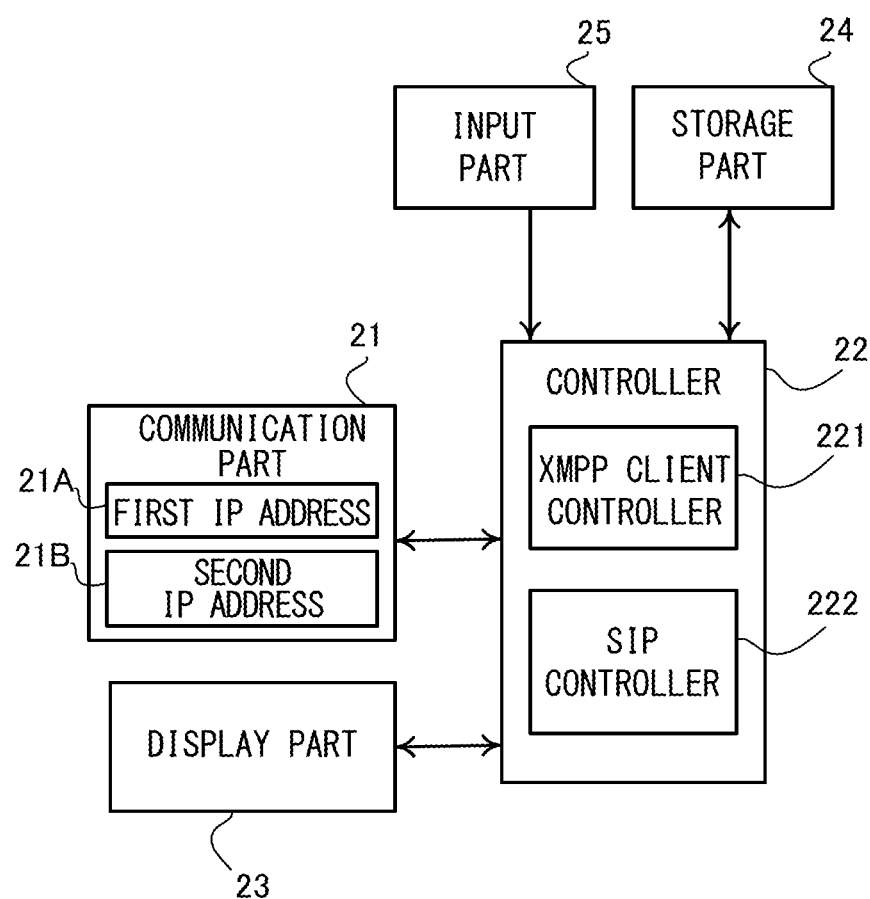
FIG. 2 is a block diagram showing the configuration of a transmitting terminal according to the first embodiment of the present invention.

FIG. 2 is a block diagram of the configuration of the transmitting terminal C1. The receiving terminal C2 has a roughly identical configuration. The transmitting terminal C1 has a controller 22 for controlling various parts. The controller 22 is connected to a communication part 21, a display part 23, a storage part 24, and an input part 25. The display part 23 displays specific data, such as multimedia data. The input part 25 is operated by and receives input from a user, and receives various instructions given to the transmitting terminal C1. The storage part 24 is configured from ROM, RAM, and the like; and stores a specific program, data inputted via user input operations, and the like. The communication part 21 is configured so as to be capable of wired or wireless communication, and is capable of communication in a protocol regulated via SIP or XMPP.

"SIP" is an abbreviation for Session Initiation Protocol. In order to engage in communication of various types of data, sound, video, and the like over a TCP/IP network, communication between terminals is initiated and terminated. For this reason, SIP is referred to as a call control protocol. As operations via TCP/IP are standardized as a rule, it has a high affinity with protocols used on the Internet, and is an extremely simple protocol.

XMPP (eXtensible Messaging and Presence Protocol) is an XML (eXtensible Markup Language)-based protocol defined and standardized by the XMPP Standards Foundation (XSF) independently from the XMPP Working Group of the Internet Engineering Task Force (IETF). XMPP dynamically controls applications such as instant messaging, chat status (the current status of the other user), multi-participant chat, voice or video calls, collaboration, content syndication, generalized XML data routing, and the like. Real-time communication is thereby performed over communication systems such as the Internet. The protocol is formed from a plurality of XMPP Extension Protocols (XEP), each of which being defined for respective purposes.

The communication part 21 has a first IP address 21A and a second IP address 21B. The first IP address 21A is used for communication in the wide area IP network net1, and the second IP address 21B is used for communication in the Internet network net2. The first IP address 21A constitutes IPuac, and the second IP address 21B constitutes IPc1. In the case of the receiving terminal C2, the first IP address 21A constitutes IPuas, and the second IP address 21B constitutes IPc2.

The controller 22 has an XMPP client controller 221 and a SIP controller 222.

In the XMPP client controller 221, a variety of application protocols regulated by XMPP can be used. In the present embodiment, xep-0166: Jingle is used. xep-0166: Jingle is a protocol regulating the function of establishing a communication route for sending and receiving data between the transmitting terminal C1 and the receiving terminal C2.

The SIP controller 222 creates SIP control data for communicating with the receiving terminal C2, and decodes SIP control data received from the receiving terminal C2. Control such as call connection processing is performed according to the SIP control data. For example, during a conversation, voice data is encoded, and the encoded data is sent as Real-time Transport Protocol (RTP) packets.

Next, an operation of opening the short circuit XD from the transmitting terminal C1 to the receiving terminal C2 will be described using the timing chart shown in FIG. 3.

In step S1, the transmitting terminal C1 requests to connect to the desired receiving terminal C2 using an SIP URI (for example, a telephone number). In this case, an INVITE request is sent to the relay server S.

In step S2, the relay server S identifies the IP address of the receiving terminal C2 from the SIP URI, and sends an INVITE request to the receiving terminal C2.

In step S3, the relay server S returns a provisional 100 Trying response to the transmitting terminal C1, informing it that an attempt to connect to the receiving terminal C2 is being made.

In step S4, the receiving terminal C2, having received the INVITE request, initiates reception processing. Specifically, a 180 Ringing response indicating that paging is being performed is returned to the relay server S.

In step S5, the relay server S relays the 180 Ringing response returned from the receiving terminal C2 and sends it to the transmitting terminal C1.

In step S6, the receiving terminal C2 sends a 200 OK response to the relay server S. In step S7, the relay server S sends a 200 OK response to the transmitting terminal C1.

In step S8, the transmitting terminal C1 sends an ACK request indicating that the 200 OK response has been received to the receiving terminal C2.

Communication between the transmitting terminal C1 and the receiving terminal C2 is established by the receiving terminal C2 receiving the ACK request.

Through the above steps S1 through S8, communication using SIP control data is performed over the control circuit SC.

In step S9, sending and receiving of SIP/SDP (Session Description Protocol) data using the data circuit SD is initiated. The transmitting terminal C1 sends DNS setting information d1 as shown in FIG. 4, and the transmitting terminal C2 (*2) sends DNS setting information d2 as shown in FIG. 5. By sending and receiving this setting information, the terminals are capable of discovering each other's respective service information. Then, using forwarding route setting information e1 as shown in FIG. 6, XMPP communication is initialized. XMPP control data constitutes the forwarding route setting information e1.

From the next step on, a detailed description is given of a procedure by which the short circuit XD is opened between the transmitting terminal C1 and the receiving terminal C2.

Here, the transmitting terminal C1 is the one proposing opening the short circuit XD, i.e., the Jingle initiator. The receiving terminal C2 is the one that accepts or denies the proposal to open the short circuit XD, i.e., the Jingle responder.

Figure 7:
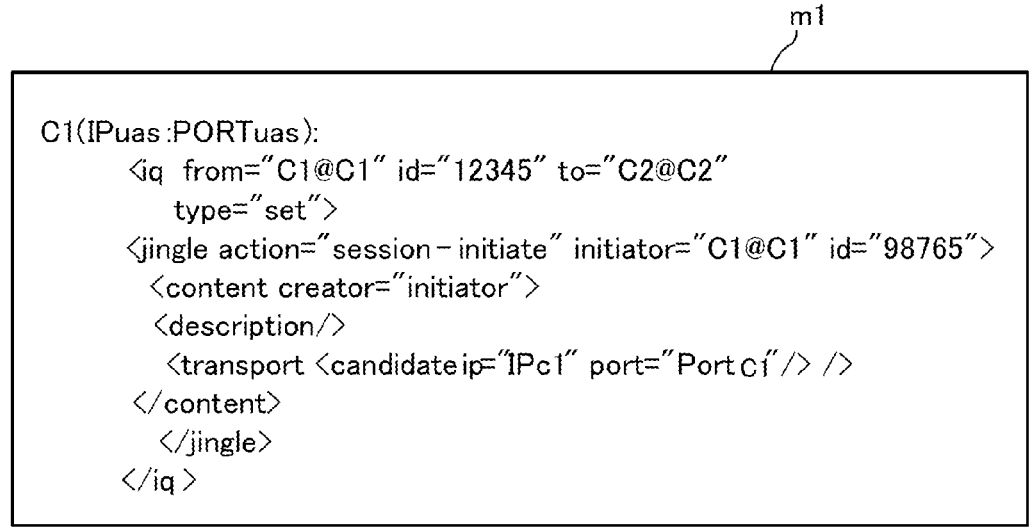
FIG. 7 is an illustration of XMPP control data according to the first embodiment of the present invention.

In step S10, the transmitting terminal C1 sends a proposal to the receiving terminal C2 to open a Jingle circuit. When this happens, forwarding route setting information m1 as shown in FIG. 7 is created in the XMPP client controller 221 and sent to the receiving terminal C2. In the forwarding route setting information m1, the <iq> tag includes a "Jabber ID" (JID) for the transmitting terminal C1 acting as the sender, an identifier ("12345") for the forwarding route setting information m1, a JID for the receiving terminal C2 to which data is being sent, a type attribute ("set") for the forwarding route setting information m1, and the like. The IP address and port number used in the short circuit XD are set in the <transport <candidate>> tag. XMPP control data constitutes the forwarding route setting information m1.

In step S11, an XMPP client controller 221' of the receiving terminal C2 sends forwarding route setting information m2 (cf. FIG. 8) indicating confirmation of the proposal to the transmitting terminal C1.

Figure 8:
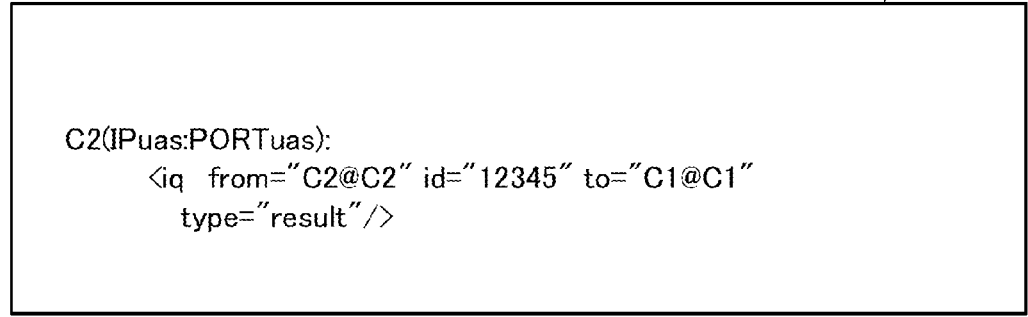
FIG. 8 is an illustration of XMPP control data according to the first embodiment of the present invention.

In the forwarding route setting information m2, the <iq> tag includes a Jabber ID (JID) for the receiving terminal C2 acting as the sender, an identifier ("12345") for the forwarding route setting information m1 confirmed by the receiving terminal C2, a JID for the transmitting terminal C1 to which data is being sent, and a type attribute ("result") for the forwarding route setting information m2, as shown in FIG. 8.

In step S12, negotiation (Jingle circuit negotiation) regarding the contents of the settings for opening the short circuit XD is conducted between the transmitting terminal C1 and the receiving terminal C2. Transport settings (for example, an IP address set, port number, or the like) enabling communication between the terminals are thereby decided upon.

In step S13, the XMPP client controller 221' of the receiving terminal C2 sends forwarding route setting information m3 (cf. FIG. 9) indicating acceptance of the proposed short circuit XD settings to the transmitting terminal C1.

In step S14, an XMPP client controller 221 of the transmitting terminal C1 sends forwarding route setting information m4 (cf. FIG. 10) confirming the received forwarding route setting information m3 to the receiving terminal C2.

The XMPP control data (e.g., forwarding route setting information m1 to m4) communication in steps S10 to S14 is performed using the data circuit SD.

The communication in steps S1 through 14 constitutes communication over the wide area IP network net1. In this communication, the first IP address 21A (IPuac) of the transmitting terminal C1 and the first IP address 21A' (IPuas) of the receiving terminal C2 are used.

In step S15, after the processing described above, a short circuit XD used for direct communication between the transmitting terminal C1 and the receiving terminal C2 is opened. In communication over the short circuit XD, the second IP address 21B (IPc1) of the transmitting terminal C1 and the second IP address 21B' (IPc2) of the receiving terminal C2 are used.

Figure 13:
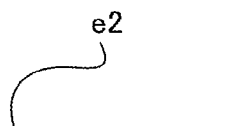
FIG. 13 is an illustration of XMPP control data according to the first embodiment of the present invention.

The transmitting terminal C1 sends DNS setting information d3 as shown in FIG. 11, and the transmitting terminal C2 sends DNS setting information d4 shown in FIG. 12. By sending and receiving this setting information, the terminals are capable of discovering each other's service information. Then, using forwarding route setting information e2 as shown in FIG. 13, XMPP communication is initialized.

In step S16, a method BYE is sent from the transmitting terminal C1 to the receiving terminal C2. In step S17, a 200 OK response to the method BYE is returned from the receiving terminal C2 to the transmitting terminal C1. Communication between the transmitting terminal C1 and the receiving terminal C2 over the wide area IP network net1 is thereby completed.

Figure 14:
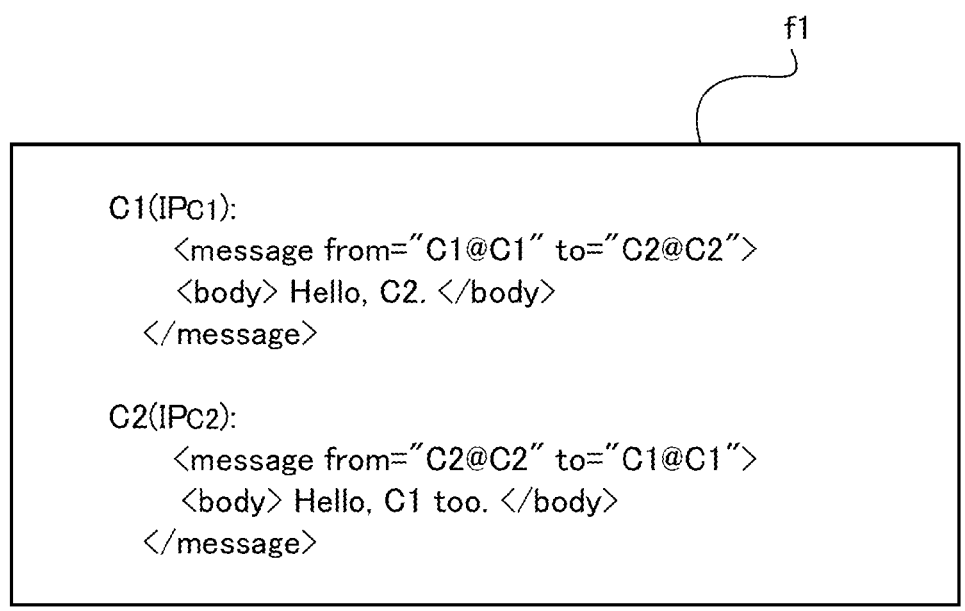
FIG. 14 is an illustration of message contents according to the first embodiment of the present invention.

Therefore, in step S18, communication not performed over the relay server S is executed. Then, for example, a message f1 such as that shown in FIG. 14 is sent or received. This communication constitutes serverless communication, and an XMPP server is not needed. Specifically, correspondence between the transmitting terminal C1 and the receiving terminal C2 is performed directly over the short circuit XD. The short circuit XD is provided within the Internet network net2, and direct data correspondence between the transmitting terminal C1 and the receiving terminal C2 over the Internet is possible.

In accordance with the embodiment described above, the communication system 1 has the relay server S assigned to the wide area IP network net1 and having a SIP function, the transmitting terminal C1 transmitting over the relay server S, and the receiving terminal C2 receiving over the relay server S; the transmitting terminal C1 and the receiving terminal C2 have the first IP address 21A for communicating over the wide area IP network net1 and the second IP address 21B for communicating over the short circuit XD in the Internet network using XMPP as the communication protocol; and the transmitting terminal C1 switches to the short circuit XD and communicates after communication with the receiving terminal C2 is established over the wide area IP network net1.

Therefore, by using an existing relay server S maintained by a specific provider, a system enabling communication between terminals in different networks can be easily constructed. Also, by providing a plurality of circuits between the transmitting terminal C1 and the receiving terminal C2 in different networks, from which the terminals can select a line, a communication system enabling improved reliability and flexibility of communication between the transmitting terminal C1 and the receiving terminal C2 can be provided.

Furthermore, because multicast DNS generally cannot be used between terminals on different networks, it is difficult to find the terminal with which communication is desired. However, by using an existing relay server S, as in the case of the present embodiment, it is possible to readily find terminals on different networks.

After the transmitting terminal C1 switches to the short circuit XD, communication with the wide area IP network net1 is terminated in order to reduce communication costs by terminating circuits not being used.

The wide area IP network net1 is formed from the control circuit SC and the data circuit SD, and the transmitting terminal C1 sends SIP control data over the control circuit SC and XMPP control data over the data circuit SD. Improved data forwarding efficiency is thus promoted by varying the type of data sent according to the circuit.

The forwarding route setting information m1 and other XMPP control data is formed from an HTML file. Thus, the XMPP control data can be flexibly and easily corrected.

The transmitting terminal C1 identifies the receiving terminal C2 using a SIP URI (telephone number or the like). Because the receiving terminal C2 can be identified by the telephone number, it can be identified more easily than in cases where IP addresses or domains are used.

Second Embodiment

In the first embodiment, communication with the wide area IP network net1 was terminated in steps S15 and 16, but communication may also be continued. For example, in cases where a band is guaranteed in the wide area IP network net1, important data is sent with priority over the wide area IP network net1. By selecting the circuit depending on the purpose of use, the reliability and flexibility of communication between networks can be improved.

The transmitting terminal C1 is configured so that the first IP address 21A and the second IP address 21B differed, but a configuration wherein they are the same may also be adopted. In this case, the route (routing information) of the partner with which communication is desired need only be changed according to the protocol.

What is claimed is:

1. A communication system comprising a relay server assigned to a wide area Internet Protocol (hereinafter IP) network and having a Session Initiation Protocol (hereinafter SIP) function, a transmitting terminal transmitting over the relay server, and a receiving terminal receiving over the relay server;

the transmitting terminal and the receiving terminal having a first IP address for communicating over the wide area IP network and a second IP address for communicating directly, without passing through the wide area IP network, over a short circuit in an Internet network using eXtensible Messaging and Presence Protocol (hereinafter XMPP) as a communication protocol; in which:

the transmitting terminal switches to the short circuit and communicates after communication with the receiving terminal is established over the wide area IP network;

the wide area IP network comprises a control circuit and a data circuit; and the transmitting terminal sends SIP control data over the control circuit and XMPP control data over the data circuit.

2. The communication system according to claim 1, in which:

communication over the wide area IP network to which the receiving terminal has been connected is terminated after the transmitting terminal switches to the short circuit.

3. The communication system according to claim 1, in which:

the XMPP control data comprises a hypertext markup language (hereinafter HTML) file.

4. The communication system according to any of claims 1, 2, and 3, in which:

the transmitting terminal identifies the receiving terminal using an SIP Uniform Resource Identifier (hereinafter URI).

5. A communication method comprising a relay server assigned to a wide area Internet Protocol (hereinafter IP) network and having a Session Initiation Protocol (hereinafter SIP) function, a transmitting terminal transmitting over the relay server, and a receiving terminal receiving over the relay server;

the transmitting terminal and the receiving terminal having a first IP address for communicating over the wide area IP network and a second IP address for communicating directly, without passing through the wide area IP network, over a short circuit in an Internet network using eXtensible Messaging and Presence Protocol (hereinafter XMPP) as a communication protocol;

the method comprising the steps of:

establishing communication between the transmitting terminal and the receiving terminal over the wide area IP network, and switching to the short circuit and communicating; wherein the wide area IP network comprises a control circuit and a data circuit; and the transmitting terminal sends SIP control data over the control circuit and XMPP control data over the data circuit.

6. The communication method according to claim 5, further comprising the step of:

terminating communication over the wide area IP network to which the receiving terminal has been connected after the transmitting terminal switches to the short circuit.

* * * * *